3,751,387
SELF-SUPPORTING STRUCTURES FOR NUCLEAR
RADIATION SHIELDS AND BINDERS THEREFOR
William Cornelius Hall, Central Valley, and John Merriam Peterson, Rock Tavern, N.Y., assignors to Chemtree Corporation, Central Valley, N.Y.
No Drawing. Filed Apr. 13, 1971, Ser. No. 133,751
Int. Cl. C04b 35/68; G21c 11/00; G21f 1/10
U.S. Cl. 252—478                                    17 Claims

ABSTRACT OF THE DISCLOSURE

A composition is provided which is adapted for producing a self-supporting structure and particularly a nuclear radiation shield. The composition includes a mixture of at least two solid materials and a solvent for one or more of these materials admixed with the mixture of solid materials. The solvent employed may be water or an organic compound, or the like. The solute may be inorganic or an organic compound and preferably sucrose. The other solid material or materials are substances that have good attenuating characteristics for nuclear radiation of various types and energy levels, particularly for neutrons and gamma (or X-ray) radiation. These substances contain atoms such as hydrogen, which are effective in reducing neutron energy by elastic scatter; atoms such as carbon, which are efficient in moderating higher energy neutrons to thermal neutron energy levels; atoms such as lithium, boron and gadolinium, which are good elements for the capture of thermalized neutrons; and atoms of heavy metals such as lead, tungsten and depleted uranium, which have good attenuating characteristics for gamma and X-ray radiation. There is also provided a method for forming a self supporting structure which comprises admixing sucrose or other soluble material with a second solid material, a solvent for the sucrose or its substitute being employed. The ingredients are mixed to obtain preferably a saturated solution of the solute and a product of mortar consistency. This product is shaped and cured to form a self-supporting structure.

BACKGROUND

Field of invention

This invention relates to self-supporting structures formed by admixing a combination of two or more solid substances with a suitable amount of solvent for one or more of the solid components, and allowing the combined mixture to set by removing part or all of the solvent. More particularly, the invention relates to self-supporting structures especially useful for nuclear radiation shields.

Prior art

Compositions are known which employ sucrose or the like for various purposes. For example, in U.S. Pat. No. 2,977,650 (Ilenda et al., Apr. 4, 1961), there is disclosed an improved adhesive composition in which sucrose is employed. This patent, however, fails to reveal that such a composition may be employed for the preparation of self-supporting structures and moreover fails to reveal that such compositions may be employed for nuclear radiation shields.

In U.S. Pat. No. 2,965,504 (Gogek, Dec. 20, 1960), there is disclosed moisture-resistant refractory blocks in which are employed sugars including dextrose, sucrose or fructose. The technique involved in this patent requires the baking of the blocks in kilns at temperatures of from 300° to 500° F. This patent fails to reveal a composition suitable for curing at room temperatures and moreover fails to reveal the provision of self-supporting structures suitable for use as nuclear radiation shields.

In U.S. Pat. No. 456,297 (Anthony, July 21, 1891), a plaster is disclosed in which a small proportion of sugar is employed. This reference, however, deals with plasters suitable for application to walls or the like and not to self-supporting structures and especially not to structures which are suitable as nuclear radiation shields.

SUMMARY OF INVENTION

It is an object of the invention to provide improved compositions suitable for use in the fabrication of self-supporting structures.

It is a further object of the invention to provide improved compositions and techniques suitable for the fabrication of nuclear radiation shields.

Yet another object of the invention is to provide improved processes relating to the forming of self-supporting structures and nuclear radiation shields.

To achieve the above and other objects of the invention, there is provided a composition adapted for producing a self-supporting structure or nuclear radiation shield, which composition comprises a mixture of a solid material and sucrose or the like, along with a solvent for the sucrose or its substitute, whereby a self-supporting structure can be set by removal of the solvent from the saturated solution of the solute.

The solvent employed above may be, for example, water, or it may be an organic compound, or the like. The solute may be an organic compound such as sucrose, or it may be an inorganic compound such as ammonium nitrate or ammonium borate. Preferably the solute is in powdered form and the solid material other than sucrose or other solute is preferably within a range of from one-quarter inch to 100 mesh, the volume ratio of solute to the other material being from about 2 to 35 parts to one.

Other objects, features and advantages of the invention will be found in the detailed description of some preferred embodiments as set forth below.

DETAILED DESCRIPTION

Cements or bonding agents used to impart strength to a material which otherwise might be too weak mechanically for the purpose for which it is intended may be divided into two general classes:

(1) Amorphous cement which generally is believed to form a continuous phase of high viscosity throughout the mass and completely encase other materials present where the surface tension as well as viscosity effects may play very important roles in the bonding action in this class;

(2) Crystalline cement that obtains its bonding action by the formation of a felted mass of interlocking and intergrowing crystals.

Either or both of the mechanisms of bonding action in the above-mentioned classes may be involved in the structures produced in accordance with this invention.

Additionally, there are wide variations in the structural properties of the products produced in accordance with the invention that depend upon the selection and combinations of compositions used, and the method employed in the setting procedure. Examples of the parameters involved include:

(a) selection of components and their ratios in the original mixture;
(b) particle shape and size, and size distribution of components;
(c) amount of solvent in the mortar;
(d) solvent-solute ratio;
(e) compaction of mortar initially in mold;
(f) rate of solvent removal;
(g) temperature and temperature variation during curing period;
(h) partial pressure of solvent vapor in adjacent atmosphere; and
(i) crystal habit of interlocking crystals formed.

Samples of compositions with a self-supporting physical structure in accordance with the invention are prepared conveniently by mixing the dry components in the desired ratio and then adding a sufficient amount of solvent for one of the comopnents to form a stiff mortar. The mortar is cast in a form of the desired shape (e.g., wall, roof, shelter, instrument shield, etc.) and is allowed to cure by removing all or part of the solvent. Such structures may be employed for biological protection of personnel, or for shielding instruments from nuclear radiation, natural or artificial, that interfere with the desired use of such equipment.

According to one aspect of the invention, sucrose is selected as the solute and water as the solvent. Both are readily available with a high degree of purity, are inexpensive, and contribute properties valuable to certain kinds of nuclear radiation shields. The combination of these two compounds, containing only carbon, hydrogen and oxygen atoms, adds to the shielding effectiveness of the final structure in many applications, especially those involving neutron radiation, because hydrogen is the most useful element for attenuation of neutrons and carbon is an excellent neutron moderating element.

Table 1, which follows, illustrates various compositions which may be employed in accordance with the invention, and shows in a general qualitative manner comparative strengths of the resultant products. In these particular preliminary tests, the solid materials including the sucrose were thoroughly mixed in the dry state in the indicated volumetric proportions, and then water was added slowly in the stated amount as the mixture was stirred continuously to permit obtaining a solution of all or part of the water soluble substances to approximate equilibrium conditions. The resulting paste or mortar was hand pressed into cylindrical forms measuring 4 inches in diameter and 0.4 inch in thickness, and was then cured at room temperature and relative humidity for periods varying from 40 to 100 days. The top of the mold remained uncovered during the curing process. The relative strengths of the cured test specimens were determined by breaking them manually by hand in the following manner: a test disc was held at opposite edges across a diameter by both hands, respectively, and pressure was applied at the center of the disc by both thumbs in a flexing action. A rating of "poor" indicated that the test specimen was self supporting but was quite fragile, and required very moderate pressure for breakage. A rating of "good" required considerable pressure, while "very good" required approximately the maximum pressure possible. It was barely possible to break the test wafer containing lead powder, which was rated as "excellent." All samples which were evaluated as "poor" were produced from powdered materials that, without sucrose, would not form a self supporting structure, which could be handled without breakage.

TABLE I.—COMPOSITIONS CONTAINING SUCROSE AS A BONDING AGENT

| Example No. | Composition (parts by volume) | | | Relative set | Curing time* (days) |
|---|---|---|---|---|---|
| | Sucrose | Water | Other component(s) or aggregate(s) | | |
| 1 | 1 | 4.0 | 10 copper powder | Poor | 100 |
| 2 | 1 | 5.0 | 10 carbon (lamp black) | do | 100 |
| 3 | 1 | 7.0 | 20 lithium carbonate | do | 100 |
| 4 | 1 | 7.0 | 20 lithium hydroxide | do | 100 |
| 5 | 1 | 4.0 | 10 Al powder (−200 mesh) | do | 100 |
| 6 | 1 | 3.3 | 10 boric acid | good | 60 |
| 7 | 1 | 2.5 | 7.5 calcium borate | do | 60 |
| 8 | 1 | 4.0 | 10 tin powder | Good-fair | 60 |
| 9 | 1 | 3.5 | 10 tungsten carbide | Good | 60 |
| 10 | 1 | 4.0 | 10 tungsten powder | do | 60 |
| 11 | 1 | 3.5 | 5 carbon (lamp black) | Good | 75 |
| 12 | 1 | 0.8 | 5 polyethylene powder | Good-fair | 50 |
| 13 | 1 | 0.8 | 5 polystryrene powder | do | 50 |
| 14 | 1 | 0.8 | 5 pulverized rubber | do | 50 |
| 15 | 1 | 3.0 | 5 boron nitride | do | 50 |
| 16 | 1 | 3.0 | 10 boron carbide | Good | 50 |
| 17 | 1 | 3.5 | 10 lithium carbonate | Very good | 50 |
| 18 | 1 | 2.0 | 10 calcium boride (40 mesh) | do | 50 |
| 19 | 1 | 4.0 | 10 calcium hydroxide | do | 50 |
| 20 | 1 | 3.5 | 10 calcium carbonate | do | 50 |
| 21 | 1 | 4.2 | 10 lead powder (200 mesh) | Excellent | 40 |
| 22 | 1 | 2.5 | 8 tungsten powder | Good | 50 |
| 23 | 1 | 9.3 | 24 boric acid 3 carbon | do | 50 |
| 24 | 1 | 7.5 | 20 lithium carbonate 3 carbon | do | 50 |
| 25 | 1 | 4.0 | 10 ferric oxide | do | 50 |
| 26 | 1 | 0.5 | 5 iron ore concentration | do | 50 |
| 27 | 1 | 2.8 | 10 colemanite ore | Good | 50 |
| 28 | 1 | 5.0 | 10 rare earth oxide concentrate | do | 50 |
| 29 | 1 | 5.0 | 8 dysprosium oxide | do | 50 |
| 30 | 1 | 5.0 | 8 gadolinium oxide | do | 50 |
| 31 | 1 | 4.6 | 8 gadolinium tungsten | do | 50 |
| 32 | 1 | 4.6 | 8 gadolinium metal powder | do | 50 |

*Uncontrolled room temperature and relative humidity.

Subsequent tests showed that physical structures superior to those indicated in Table I could be obtained in every case, respectively, by more careful control of the variables involved.

In the sucrose-water series of subsequent tests, the quantity of sucrose and the sucrose-water ratio were important variables. These, in turn, were dependent to a large degree upon the volume of voids in the dry mixture prior to the addition of water. Satisfactory structures were obtained with a wide range of concentrations but optimization of high strength, increased density, and minimum cure time can be controlled in part by adding sufficient sucrose and water to insure that the resultant saturated sucrose solution completely fills all voids in the mixed materials comprising the dry mixture of components in a loose but well shakened down condition, and wets all surfaces of the dry ingredients. The void space was determined by dividing the apparent bulk density by the sum of the partial true densities of the individual components in the mixture. No difficulties were encountered in completely filling the voids between the particles of dry ingredients as surface tension and capillary effects pulled the liquid phase into the void spaces, provided the liquid phase was present in sufficient volume for this purpose. The liquid phase present apparently lubricated the surfaces of the dry ingredients which permitted further compaction of the mass and reduction of voids between solid particles, even with the mild application of hand pressure. Higher density products with higher structural strengths are produced with the application of higher pressures in the molding operation, but these higher pressures are not essential for satisfactory structures.

The solubility of sucrose in water is a function of the temperature and impurities present. A saturated solution of pure sucrose in pure water contains 66.6% by weight sucrose at 20° C. and 68.2% by weight sucrose at 30° C. Too little solution in the mortar mixture gives a lower density finished product, and a lower strength product contained voids with fewer points of contacts with interlocking sucrose crystals. Excess solution in some cases improves the workability of the mortar but, on the other hand, produces additional voids in the final product, which results from removal of more water from the mixture, and a longer cure time. Use of hot water gives a workable mortar containing less water, because of the higher solubility of sucrose. The optimum control of variables is a compromise of the most desirable characteristics of both process and product and depends also on the particular application involved.

It is desirable, although not necessary, to use a quantity of sucrose in excess of that required to form a saturated solution with the water at all times. Considerable excess may be advantageous in many cases in yielding a superior product, but such an excess also has the disadvantage of requiring more water to produce the saturation solution to fill the voids between the sucrose crystals themselves, and thus there is an increase in the amount of water to be removed and consequently an increase in curing time. The sucrose used in these tests had a bulk density of 0.94 g. cm.$^{-3}$ with a true density of 1.59 g. cm.$^{-3}$, indicating approximately 41% voids. Percentage voids in other components of compositions tested ranged from about 39 to 54 percent.

Another important variable that affects the character of the cured product is the procedure used to remove water from the mortar. When the partial pressure of water vapor in the atmosphere surrounding the mortar is less than the partial pressure of water in the saturated sucrose solution in the mortar, a net quantity of water will be transferred from the liquid phase in the motar to the vapor phase in the atmosphere.

A saturated aqueous sucrose solution at 25° C., for example, has a vapor pressure of approximately 18 mm. Hg, corresponding to a 77.5% saturation of air at this temperature. This is the critical point that determines the direction of net mass transfer of water between the mortar and the surrounding atmosphere for these conditions of temperature and humidity. Each temperature similarly will have a corresponding critical relative humidity. Some of the compositions have components that have a mutual solubility with sucrose in aqueous solution, which in turn affects the partial pressure relationships, but the basic principles of mass and energy transfer do not change. When water is transferred out of the liquid phase, a supersaturated sucrose solution results and, to restore equilibrium, there will be nearly a simultaneous mass transfer of sucrose molecules from the liquid phase in the solution to the solid phase in the mortar. This is a condition which must be achieved and controlled in the practice of this invention to produce the formation of a matted crystalline sucrose mass that contributes to the structural strength of the cured product, according to the second type of bonding action described earlier.

Nucleation problems generally are not encountered because of the presence of numerous small sucrose crystals throughout the mortar. To satisfy energy relationships, for both phase changes, in accordance with the laws of thermodynamics, energy transfers occur simultaneously. These processes in combination produce a mass of interlocking and intergrowing sucrose crystals in the spaces between the other components in the mortar that binds the entire mass together. Best results are obtained when there is sufficient sucrose to form a continuous phase in the mixture. The process continues until substantially all of the saturation sucrose solution disappears.

Of course, sucrose, like other materials, cannot be dried below its equilibrium moisture content, which is the moisture content that is in equilibrium with the surrounding atmosphere at its equilibrium temperature. Usually, this is only a few tenths of a percent of moisture. In many cases, however, satisfactory structures are reached considerably short of equilibrium conditions.

On the other hand, self supporting structures are obtained when only the surface of the other solid material is wet by a very thin film of solution, with the voids remaining substantially empty. In this case, the cementing action occurs only at the points of contact and the resulting porous structure is weaker than if the voids had been filled with solution.

Reduction in the partial pressure of water vapor in the atmosphere may be achieved by any standard dehumidifying process, although heating of the air often is most convenient method used. The same effect may be secured by heating the mortar, for example, by an infra-red lamp. Substantially all water in the mortar is lost at a temperature of 105° C. irrespective of the relative humidity. Prolonged temperatures above this point cause some degree of molecular decomposition of the sucrose. Use of a blower or fan to circulate low humidity air adjacent the surface of the mortar assists in maintaining a driving force that accelerates the rate of curing. However, care should be taken not to maintain too high a rate of water removal and subsequent crystallization. At high rates, a surface glaze or crust of sucrose solid may form, which actually may retard the rate of water evaporation, because the diffusion rate of water vapor through the glazed surface is less than the diffusion rate of water through the liquid phase. For example, circulation of 90° C. preheated air across the surface of a test specimen increased the ultimate curing time by approximately 25 percent, compared with a similar procedure on a record test piece using 25° C. air.

The method of removal of water from the uncured mortar is not limited to the evaporation process alone, brought about by control of temperature-relative humidity relationships. For example, water may be removed by its action with other components in the composition to form a hydrate in cases where water of crystallization is involved, or by the formation of a hydroxide on basic oxide when an inorganic oxide is used as the second solid or aggregate, or when water is removed in any hydrolysis reaction with any components in the mixture. Beneficial results are obtained when the partially cured mortar is alternately heated and cooled, which causes successive solution and dissolution of sucrose at the interfaces of the two phases. This process produces a stronger bonding action by the formation of a felted mass of interlocking and intergrowing sucrose crystals that knits the mass together at a larger number of points. Slight changes of equilibrium in different parts of the structure can cause moisture transfer or changes in solubility with subsequent dissolution and recrystallization. Similar changes can occur where high relative humidity exists, causing water transfer from the atmosphere to the mortar. In general, a combination of all of these processes continues over a long period of time, and thus the strength of the finished product generally improves with age. Transfer of water from an atmosphere with high relative humidity may become excessive, and may continue to a point where solution of binding crystals of sucrose actually weakens the product. In these cases, application of any one of the widely available standard industrial water resistant sealant at the time that the mortar is dry will eliminate the difficulty. An epoxy-type resin is particularly effective in this respect, which also has the added advantage of imparting a tough, long wearing surface to the cured product.

Temperature changes in the mortar may be achieved conveniently by using hot water in the preparation of the mortar. The same result may be obtained by using in the initial composition an anhydride that reacts with water with the evolution of heat. For example, the acid anhydride, $B_2O_3$, may be substituted for a part of the $H_3BO_3$, in the desired composition, or the basic anhydride, $CaO$, may replace part of the $Ca(OH)_2$. Starting with a mixed mortar at an elevated temperature generally produces a more workable mortar, other factors remaining constant, and also has the advantage of producing a stronger structure as a result, upon cooling, of greater mass transfer of solute from liquid phase saturated solution to interface solid phase. The few examples of solutes with a negative temperature coefficient of solubility, of course, would be exceptions.

A hard glazed surface may be obtained if an atomized water mist is sprayed lightly on a surface of a substantially cured mortar, followed by a drying process, especially one employing a heat source such as an infra-red lamp. Best results are obtained by repeating the process two or more times, followed by sealing the finished dry surface with one of the many available well known protective coatings. This process is useful if the mortar is plastered on a wall where both decorative and nuclear radiation shielding effects are desired simultaneously, as for example, in a radiation laboratory or hospital radiation facility. The process is equally applicable for the manufacture of wall tile. By controlling the crystallization rate of the sucrose, a decorative glistening effect from sucrose crystals also can be produced. Application of small amounts of colored finely powdered pigments dusted on the surface during the final treatment can further alter the decorative effects.

The following example is given for the purpose of illustrating this application: Four volumes of water were added slowly during the stirring of a dry mixture of 7 volumes of 40 mesh calcium carbonate and 1 volume of granulated sucrose. The resulting mortar was plastered to a thickness of 3/8 inch to a wetted masonry wall. After curing at a temperature fluctuating between 55°–72° F. for seven days, the surface was sprayed by water from an atomizer at the rate of 0.5 gram per square foot of surface. This spray treatment was repeated at the end of the second and third week, followed by radiation with a 150 watt infra-red lamp. The result was a glistening decorator white surface, which was sealed, hardened and preserved by a light spray coat of a clear epoxy resin.

A light dusting of red ferric oxide powder to the surface following the first two water sprays permitted variations in the final appearance.

The curing or setting of mortars containing sucrose may involve many secondary effects, some of which may partly be associated with the bonding action. Sucrose itself may hydrolyze, the rate depending upon such factors as concentration, temperature and pH. Each molecule of sucrose yields one molecule of fructose and one molecule of dextrose. The dextrose crystallizes as the monohydrate, $C_6H_{12}O_6 \cdot H_2O$ and could thus remove some of the water from its role as a solvent for the sucrose. Furthermore, the presence of dextrose, as well as other components in the initial mixture, or formed after the solvent was added, will affect the solubility of sucrose in the liquid phase, and thus change the mass transfer relationships. Crystallization of sucrose generally is retarded by the presence of the products of hydrolysis.

The rate of hydrolysis of sucrose is increased as pH decreases and may be significant when boric acid is a component of the mixture. Boric esters may be formed, but usually at elevated temperatures. On the other hand, alkaline solutions retard hydrolysis, but favor polymerization, alkaline condensation and/or formation of alkaline complexes of sucrose. When high concentrations of lime are present, there is evidence that calcium saccharates, or complexes between sucrose and calcium oxide in various ratios are formed.

The relative contributions of such secondary effects on the final characteristics of the products formed are not completely known, and consequently this invention is not intended to be limited in scope to any particular mechanism or combination of mechanisms. The chief function of sucrose is not dependent on chemical reaction, however, and thus the amount of sucrose applicable for this invention is not limited to stoichiometric relationships. The amount usable is not narrowly critical and varies to a great extent depending on the nature of other components, and especially with reference to particle shape, size and size distribution (e.g. ¼ inch to 100 mesh). A particle size of about 40 mesh often required 50 percent less bonding agent to achieve equal strength, than when using 200 mesh material of the same ingredient. In general, an amount in the range of about 1 part by volume of sucrose to about 3 to 30 parts by volume of other components appears to yield satisfactory, although not optimum, results. Higher or lower ratios may be used, if necessary, in particular application involving mortars which can be casted, poured, sprayed or plastered. A standard bonding agent such as "Bondex," many of which are well known in the art, often may be used advantageously when the mortar is plastered to another surface.

The self-supporting structures of the present invention can be molded to any desired shape which are particularly useful as radiation shields, and, to this effect, sucrose is added to one or more dry materials which are known as effective shielding materials.

Sucrose itself, since it contains only carbon, hydrogen and oxygen, actually adds to the shielding effectiveness of the final structure, because hydrogen is the most useful element for attenuation of neutrons and carbon is an excellent neutron moderating element.

Thirty two examples in Table I illustrate a few of the multiplicities of wide variations in compositions that may be employed to produce self supporting nuclear radiation shields. A few specific examples may be cited to illustrate some of the many particular advantages of these combinations:

Example 16, with sucrose and boron carbide furnishes carbon atoms from both solids, and these carbon atoms along with hydrogen atoms from the sucrose are very effective in moderating higher energy neutrons to near thermal energy, when they are readily captured by boron atoms.

Example 18, containing sucrose and calcium boride, differs from the preceding example in that it contains the higher atomic number calcium (20), which is relatively more effective in the attenuation of gamma radiation, and yet has a relatively low activation from spallation energy protons and neutrons.

Example 27, using Colemanite ore, a boron containing natural ore, is another means of introducing the boron atom into the shielding composition, as well as hydrogen atoms in the form of water of hydration. It has the advantage of low cost, but has the disadvantage of containing various impurities, such as sodium, which may itself become activated in certain radiation fluxes.

Example 17, with sucrose and lithium is also a good composition for neutron attenuation. While the lithium atom is significantly less effective than the boron atom for thermal neutron capture, the lithium atom does not generate the approximately ½ mev. gamma radiation resulting from the thermal neutron capture by boron.

Various rare earth elements, especially gadolinium and dysprosium, have very high cross section values for thermal neutron capture and these atoms may be introduced in the compositions of this invention, as are shown by Examples 28, 29, 30, 31 and 32.

The previous discussion has been limited to compounds containing isotopes of the atoms in natural abundance. However, there are great differences in thermal neutron cross section values for capture not only between different elements but also between the various isotopes of the same element. The following tabulation illustrates these differences.

CAPTURE OF THERMAL NEUTRONS

Cross section values for selected elements and their isotopes

| Element: | Cross section values (barns) |
|---|---|
| Lithium (natural abundance) | 71 |
| Lithium Li$^6$ (7.5) | 945 |
| Boron (natural abundance) | 755 |
| Boron B$^{10}$ (18.8) | 4010 |
| Dysprosium (natural abundance) | 1100 |
| Dysprosium Dy$^{164}$ | 2000 |
| Gadolinium (natural abundance) | 46,000 |
| Gadolinium Gd$^{157}$ (15.7) | 240,000 |

Compounds enriched with isotopes having the higher thermal neutron cross section values may be substituted for the corresponding compounds containing isotopes in natural abundance in the example cited, to give compositions with greatly improved attenuating characteristics.

Examples 9, 10, and 22 containing tungsten, and Example 21 containing lead atoms, illustrate the use of heavy metals in the compositions for effective attenuation of gamma radiation. Increased densities with corresponding improvement in gamma attenuation, were produced when ⅜ inch pellets of tungsten metal, or No. 12 lead shot were added as aggregates to the respective matrix materials with compositions cited in these examples containing heavy metals.

Examples 12, 13 and 14 containing high molecular weight hydrocarbons indicate a means of increasing the hydrogen atom concentration of the compositions to give significant improvement in neutron attenuation.

Example 23 with boric acid addition is a means of enriching both hydrogen and boron atoms in the compositions.

Other crystalline sugars such as lactose or maltose or other easily crystallized carbohydrates, may be substituted sucrose. For example, a self supporting structure was obtained when lactose was substituted for sucrose in Example 21, Table I, and substitution of maltose for sucrose in Example 27, Table I, also produced a self supporting structure. The lactose, containing one molecule of water of crystallization, introduced desirable hydrogen atoms into the composition. Sucrose, however, does have the advantage over some carbohydrates of greater stability in alkaline media, and somewhat better physical structure for comparable concentration and curing times.

This invention is not limited to the addition of a single solid added to the sucrose or its substitute. Compositions may be modified in various ways as illustrated by the following examples.

(1) One part of sucrose, 5 parts of colemanite, 5 parts calcium carbonate (14 mesh), 5 parts of portland cement and 2.5 parts of charcoal (20 mesh) were thoroughly mixed dry and then sufficient water was added slowly, while the mixing operation continued, to give a stiff mortar of the consistency suitable for standard cement operation. The motar was placed in a form and was cured uncovered at uncontrolled room temperature for 28 days. A self supporting shield was formed suitable for neutron attenuation.

(2) Using a composition expressed as weight percent, of 5 parts sucrose, 5 parts of titanium hydride, 10 parts high density polyethylene beads (20 mesh) 79 parts lead powder (200 mesh) and 1 part powdered anthracite coal, with sufficient water to form a stiff mortar, and employing the method described in the previous example, a self supporting shield was formed that was suitable for a mixed nuclear radiation flux consisting of neutrons and gamma radiation.

The process is not limited to the use of pure water as the solvent. For example, a mixture of ethanol and water may be employed with sucrose as a solute. The solubility of sucrose decreases at 25° C. from 66.6% by weight in water to 56.2% in a solvent mixture consisting of 25% by weight of ethanol. The presence of ethanol permits easier solvent removal in the curing process.

Various combinations also may be suitable using either an inorganic or organic solute each in combination, respectively, with either an inorganic or organic solvent.

Examples of self-supporting physical structures produced by employing various solvents and solutes in the manner similar to that previously described for water and sucrose are shown in Table II.

TABLE 2.—COMPOSITION UTILIZING VARIOUS SOLVENTS AND SOLUTES

| Bonding agent | Solvent | Other components(s) |
|---|---|---|
| Urea | Water | Boron nitride. |
| Do | Methanol | Carbon (charcoal) and calcium borate (equal parts). |
| Benzoic acid | Acetone | Calcium boride. |
| Ammonium nitrate | Water | Boron carbide. |
| Ammonium borate | do | Tungsten carbide. |
| Anthracene | Benzene | Lithium carbonate. |

All of the examples shown in Table 2 were prepared by mixing 1 volume of the saturated solution of the bonding agent in its respective solvent with two volumes of the corresponding solid other component or aggregates listed in the third column. The resulting mixtures were placed in uncovered molds and subjected to alternate successive cycles of 16 hours at 20° C. followed by 8 hours at 30° C., for a period of 28 days. All compositions produced self supporting structures at the end of the curing process.

What is claimed is:

1. A composition for producing a self supporting nuclear radiation shield comprising a mixture of
 nuclear radiation attenuating solid materials which are particularly adapted for and provide substantial attenuation of nuclear radiation,
 sucrose in concentrations of between 5 and 24 parts by volume of said solids in the mixture to one part by volume of sucrose in the mixture whereby the sucrose acts as the matrix and essential binder material for the mixture and subsequent nuclear radiation shield, and
 sucrose solvent in concentrations of between 0.5 and 10 parts by volume of solvent in the mixture to one part by volume of sucrose in the mixture, the mixture of the solids, sucrose and sucrose solvent upon addition of the solvent at ambient temperatures and pressures and being thoroughly mixed, forms a workable mortar that sets or cures to the self-supporting nuclear radiation shield by subsequent removal of said sucrose solvent from the mixture beyond the extend which makes the solvent a sucrose saturated solvent.

2. The composition of claim 1, wherein the solvent is of a type adapted for being removed by a phase change involving evaporation.

3. The composition of claim 1, wherein the solvent is of a type adapted for being removed by a phase change involving a chemical reaction with a component of the mixture.

4. The composition of claim 1, wherein the solid materials are in powdered form.

5. The composition of claim 1, wherein at least one of the materials is an aggregate ranging in size from ¼ inch to 100 mesh.

6. The composition of claim 1, wherein one of the solid materials is a neutron moderator.

7. The composition of claim 6, wherein the neutron moderator is selected from the group consisting of elemental carbon, and a compound of carbon or combinations thereof.

8. The composition of claim 1, wherein one of the solid materials is a thermal neutron capture substance.

9. The composition of claim 8, wherein the thermal neutron capture substance is selected from the group consisting of substances containing atoms of lithium, boron, gadolinium, dysprosium or combinations thereof.

10. The composition of claim 1 wherein one of the solid materials is a gamma radiation attenuating material consisting of a substance containing atoms of a heavy metal having an elemental density not less than 7.0 gram cm.$^{-3}$.

11. The composition of claim 10, wherein the heavy metal is selected from the group consisting of substances containing atoms of lead and tungsten.

12. The composition of claim 1, wherein one of the solid materials contains hydrogen atoms.

13. The composition of claim 12, wherein the solid material containing hydrogen atoms is selected from the group consisting of high molecular weight polymerized hydrocarbons, and metal hydrides, hydroxides and hydrates.

14. The composition of claim 1, wherein one of the solid materials contains an isotope with a higher concentration than that found in a natural state.

15. The composition of claim 1, wherein the cured self-supporting shield is given a finished protective coating of a sealant.

16. A nuclear radiation shield with a composition of claim 1.

17. A composition as claimed in claim 1 wherein one of said solid materials is ammonium borate.

References Cited

UNITED STATES PATENTS

| | | | |
|---|---|---|---|
| 3,161,606 | 12/1964 | Rash | 252—478 |
| 3,207,705 | 9/1965 | Hall | 252—478 |
| 3,026,214 | 3/1962 | Boyland et al. | 264—0.5 |
| 3,122,513 | 2/1964 | Dempsey | 252—478 |
| 3,250,729 | 5/1966 | Petzow et al. | 252—478 |
| 3,558,526 | 1/1971 | Hall et al. | 252—478 |
| 3,169,932 | 2/1965 | Aslam et al. | 252—478 |
| 3,434,978 | 3/1969 | Vogel | 252—478 |
| 3,148,160 | 9/1964 | Malm et al. | 252—478 |
| 3,373,118 | 3/1968 | Ronzio | 252—478 |
| 3,207,705 | 9/1965 | Hall | 252—478 |

FOREIGN PATENTS

| | | | |
|---|---|---|---|
| 6406733 | 12/1964 | Netherlands | 252—478 |

OTHER REFERENCES

McMurtry and Taylor, "Studies of the Preparation of Mixed Carbide Fuel Utilizing Coprecipitation," Oct. 17, 1966, Quarterly Progress Report No. 1 (Research and Development Division, The Carborundum Company), prepared for the U.S. Atomic Energy Commission.

Hodge and Sowden, "Neutron-Shield Materials," November 1961, Nucleonics, pp. 158–166.

CARL D. QUARFORTH, Primary Examiner

R. S. GAITHER, Assistant Examiner

U.S. Cl. X.R.

250—108; 176—Dig. 2